April 20, 1926. 1,581,893
A. VERSNAEYEN
GRUBBING UP OF SUCH PLANTS AS FLAX AND THE LIKE
Filed Feb. 17, 1925
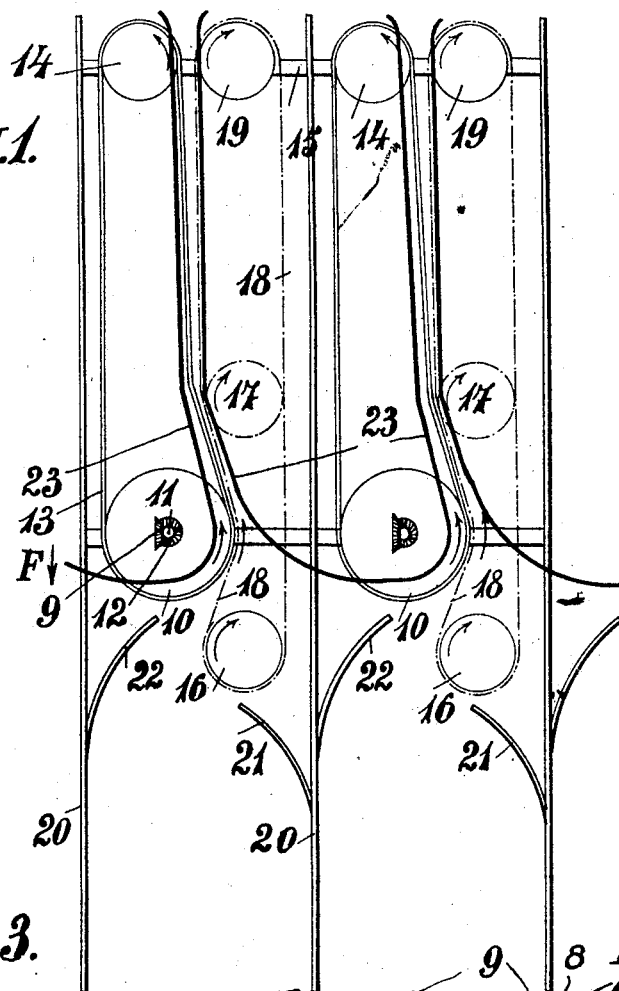
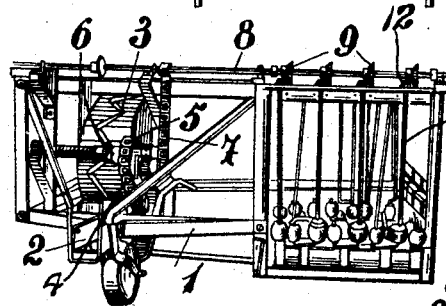
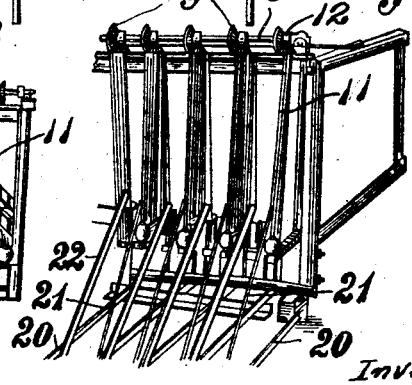
Inventor
A. Versnaeyen
by Patented Apr. 20, 1926.

1,581,893

UNITED STATES PATENT OFFICE.

ADRIEN VERSNAEYEN, OF PONT DE NIEPPE, FRANCE.

GRUBBING UP OF SUCH PLANTS AS FLAX AND THE LIKE.

Application filed February 17, 1925. Serial No. 9,848.

*To all whom it may concern:*

Be it known that I, ADRIEN VERSNAEYEN, a citizen of the French Republic, residing at Pont de Nieppe, France, have invented certain new and useful Improvements in Grubbing Up of Such Plants as Flax and the like, of which the following is a specification.

This invention relates to the grubbing up of such plants as flax and the like, and has for its object a device to effect this operation mechanically.

As a rule, grubbing up textile plants such as flax, etc., is performed by hand, with the result of requiring a considerable and costly workmanship.

Now, the device constructed as per the present invention is mounted upon a suitable frame provided with the necessary tractor coupling members, and consists of a combination of same with catching contrivances which may be under control of one of the machine wheels and next to which are placed the necessary mechanisms for supporting and driving, so grouped as to obtain, by the mere forward motion of the machine over the field to be dealt with, the grubbing up of the plants and their conveyance, always kept in proper position, until they reach some appropriate collector.

To secure this result, the machine frame is mounted upon wheels, one of which can drive, through any suitable transmission (no matter whether chain, belting, gearing or any other system) a set of rollers having a vertical axis, as also supports sufficiently distant from the ground, a belt passing round every one of these rollers and passing likewise on a loose roller, while groups of loose rollers are mounted, opposite the first ones, so as to support a belt which is tightly passed round the grubbing roller and on the first belt, in order to provide, on the one hand for the traction effort required for pulling the plant off the ground, on the other hand, for properly supporting the plants pulled away in order to drive same outside the machine.

The accompanying drawing shows one manner of carrying out the present device, namely:

Fig. 1, diagrammatic view illustrating two arrangements of two machine elements to one another.

Fig. 2 perspective view of the device employed for grubbing up;

Fig. 3, perspective view of the machine as a whole, after removal of the shields and of the contrivance for setting straight again the stalks pulled out.

With reference to these figures, the machine comprises a frame 1 mounted upon suitable wheels and provided with a coupling arrangement 2 wherewith the machine can be drawn along either by cattle or by any mechanical tractor. One of the frame wheels 3, the one we are to denominate "motive wheel," controls, through a suitable pinion, a chain 4, which, in its turn, controls, through pinion 5, clutch 6 and chain 7, a transverse shaft 8 whereon pinions 9 are keyed, each of these latter controlling an independent pulling-out device.

Every pulling-out device comprises, as seen in Fig. 1, a roller 10 keyed on a vertical shaft 11 driven by pinion 9 in mesh with a similar pinion 12. An endless belt passes upon this roller 10, the diameter of which has to be chosen in every case, said belt being indicated at 13 and passing further on a roller 14 set loose upon a transverse support 15 situated at the rear of the machine.

Near the pulling-out roller 10 are supported loose rollers 16—17 out of alignment with roller 10, and so located that a belt 18 passing on said rollers 16—17 and on a rear roller 19 comes to press against roller 10 between rollers 16 and 17, as seen in Fig. 1.

Shields 23 which may be, for example, sheet iron plate, will act as guiding arrangement for the plants pulled out. On the other hand, divisionary rods 20 (Figs. 1 and 2) will complete, together with slanting jambs 21—22, a contrivance for both guiding and raising up the stalks pulled out to bring same into contact with the grubbing rollers 10.

The machine will work as follows:

Assuming the whole to be drawn along either by cattle or any other tractive power, in the direction of arrow F, moving forward along the field border, the grubbing contrivances acting through rollers 10—14 and 16—17—19 will be likewise moved along the field, the divisionary rods 20 will effect separation of the beaten-down plants to set them up again, and, in cooperation with the jambs or slanting struts 21—22, they will bring said plants into contact with roller 10 and belt 18 in every unit of the machine.

Roller 10 being rotated in the direction of the arrow seen in Fig. 1, will cause, as a result of friction, dragging along of belts 13 and 18, so that the flax stalks brought into contact with roller 10 and belt 18 will be subjected to a pulling strain which will result in their leaving the soil.

These plants, will be held more or less tightly between belts 13 and 18 which will drag them towards the rear part of the machine keeping them all the time between the shields 23 acting as a guide arrangement for them, to finally deliver them, on reaching the rear of the machine, to some device for uniting them into bundles, unless it is preferred to simply drop them on the ground as a regularly shaped layer.

That part of the machine which is symmetrical to the pulling-out mechanism must be properly ballasted, in order that the supporting wheels may keep strictly under the portion of said machine subject to no movement above that part of the ground wherefrom the plants are being harvested.

The arrangement set forth permits of pulling the plants away subject to no crushing of their stalks, because the grubbing rollers 10 keep the flax stems pressed between themselves and the corresponding belts 18, with the result of a resilient acting propitious to a favorable outcome and subject to no risk of damaging the textile fiber.

The height of rollers 10 and that of the rollers coupled therewith could be increased, and be made equivalent to the length of the flax stems, a modification which would further reduce the degree of pressure necessary for pulling out the plants.

The various rollers can be made of any material, preferably of iron, steel or the like, since the pressure required for having the plants pulled out rather takes place between one roller and one belt than between two rollers. The motive power could as well be transmitted to rollers 16 and 17, for instance, in case of plants of a comparatively great diameter of stalk.

This invention is to be utilized for pulling out either flax or any other textile plants, or even for grubbing out any plants whatsoever by means of a comparatively small exertion and subject to no damaging of those plants.

Having now fully described my said invention, what I claim and desire to secure by Letters Patent, is:

1. A grabbing device, including a wheel frame and a grubbing mechanism carried thereby, including longitudinally aligned rollers, a belt travelling thereover, a second series of longitudinally aligned rollers, and a belt travelling over said latter rollers, said latter belt having a bearing contact on the first mentioned belt at a point coincident with one of the first mentioned set of rollers, said belts being spaced apart in advance of and in rear of said point of contact.

2. A grubbing device, including a wheel frame and a grubbing mechanism carried thereby, including longitudinally aligned rollers, a belt travelling thereover, a second series of longitudinally aligned rollers, and a belt travelling over said latter rollers, said latter belt having a bearing contact on the first mentioned belt at a point coincident with one of the first mentioned set of rollers, said belts being spaced apart in advance of and in rear of said point of contact, and means for guiding the plants between the belts in advance of the point of contact.

3. A grubbing device, including a wheel frame and a grubbing mechanism carried thereby, including longitudinally aligned rollers, a belt travelling thereover, a second series of longitudinally aligned rollers, and a belt travelling over said latter rollers, said latter belt having a bearing contact on the first mentioned belt at a point coincident with one of the first mentioned set of rollers, said belts being spaced apart in advance of and in rear of said point of contact, and means for guiding the plants between the belts in advance of the point of contact, and independent means for supporting the plants above the belt rearwardly of said point of contact.

In testimony whereof I have affixed my signature.

ADRIEN VERSNAEYEN.